United States Patent [19]

Brandner et al.

[11] 4,426,228
[45] Jan. 17, 1984

[54] CELLULOSIC MOLDING AND SPINNING COMPOUND WITH LOW CONTENTS OF LOW-MOLECULAR DECOMPOSITION PRODUCTS

[75] Inventors: Alexander Brandner, Erlenbach am Main; Hand G. Zengel, Kleinwallstadt, both of Fed. Rep. of Germany

[73] Assignee: Akzo NV, Arnhem, Netherlands

[21] Appl. No.: 296,519

[22] Filed: Aug. 26, 1981

[30] Foreign Application Priority Data

Sep. 13, 1980 [DE] Fed. Rep. of Germany ....... 3034685

[51] Int. Cl.$^3$ ............................ C08L 1/00; C08L 1/02
[52] U.S. Cl. ................................ 106/203; 106/163 R; 106/178; 106/186; 264/187; 524/35
[58] Field of Search ............... 106/186, 178, 167, 203; 536/50, 56; 264/187; 524/35

[56] References Cited

U.S. PATENT DOCUMENTS 4,144,080 3/1979 McCorsley .................. 106/186

OTHER PUBLICATIONS

Chem. Abst. 50: 16103e, Simionescu et al., (1953).
Chem. Abst. 54: 21766b Akim et al., (1960).
Chem. Abst. 59: 6603f Simionescu, (1962).

Primary Examiner—Theodore Morris
Attorney, Agent, or Firm—Michael J. Striker

[57] ABSTRACT

Molding compositions containing cellulose, 95–50% of a tertiary amine oxide, and up to 25% of a non-solvent also up to 10% of other polymers, all proportions relative to the weight of the composition and as additive, 0.01 up to 0.5% by weight, relative to the tertiary amine oxide, of an organic compound with a minimum of four carbon atoms and a minimum of two conjugated double bonds and a minimum of two groups in the form of hydroxyl and/or amino groups which, in turn, have a minimum of one unsubstituted hydrogen atom and/or contain glycerol aldehyde.

15 Claims, No Drawings

CELLULOSIC MOLDING AND SPINNING COMPOUND WITH LOW CONTENTS OF LOW-MOLECULAR DECOMPOSITION PRODUCTS

Processes for producing cellulose solutions to be utilized as, respectively, molding or spinning compounds, are of the disadvantage that during the dissolving process the cellulose is subjected to considerable decomposition of the polymer chain. The consequence thereof is an undesirable discoloration of the solutions. This, in turn, will cause discoloration of the molded shapes, such as filaments or membranes, that have been produced from these solutions.

Disposal of the discolored solution accruing after precipitation of the cellulose will, to a considerable extent, impose a burden upon the environment, so that—with the continually increasing environmental awareness of today–processing or, respectively, purification of waste water contaminated by cellulosic decomposition products can not be avoided in the long run and must be effected by extensive and costly methods.

Decomposition of the cellulose polymer chain is, however, undesirable, as it will also impair the technological properties of the molded shapes produced from the cellulose solutions, i.e. their strengths in membranes as well as in hollow filaments and filaments.

Since polymer decomposition is increasing with rising dissolving and processing temperatures as well as with longer times for dissolving and processing, it has been endeavored on the one hand, to hold as low as possible the temperature of dissolving and processing, and on the the other hand, to keep as short as possible the time for dissolving and processing.

Yet, polymer decomposition will remain unjustifiably high, even at comparatively low dissolving and processing temperatures and even then when the dissolving and processing time is kept short, (for instance by using a dual-screw extruder).

Endeavors have not been lacking in order to confine polymer decomposition during the dissolving and processing sequences of the cellulose, to limits that are as narrow as possible.

But none of these endeavors have hitherto been crowned with success.

It was possible only with the present invention, to limit polymer decomposition to such an extent that the solutions are only slightly discolored and that the molded shapes produced from the solutions display considerably improved technological properties, particularly in their strengths.

The problems present in the processes of prior art have thus been overcome.

Apart from the classic solvents for cellulose, such as xanthogenate and cuprammonium oxide, it is tertiary amino oxides in particular, that have proved themselves in this respect, and a number of processes based on tertiary amino oxides as solvents has recently been developed (DE published application No. 28 30 683, DE published application No. 28 30 684 DE published application No. 28 30 685), for producing such solutions as molding and spinning substances and also for the production of molded shapes from these solutions. The present invention is based upon these processes, as tertiary amino oxides are also used as cellulose solvents therein.

It was the object of the invention, to make available as molding or spinning substances, cellulose solutions with only small proportions of low-molecular decomposition products, this being attained by dissolving cellulose in a tertiary amino oxide, particularly N-methyl-morpholine-N-oxide.

The process as per invention is characterized by the molding or spinning substance containing as additive, singly or in a mixture, organic compounds with a minimum of four carbon atoms and a minimum of two conjugated double bonds and a minimum of two groups in the form of hydroxyl and/or amino groups which, in turn, have a minimum of one unsubstituted hydrogen atom and/or contain glycerol aldehyde.

It was found, unexpectedly, that addition of the organic compound will substantially reduce decomposition of the cellulose polymer chain, so that, molding or spinning substances are obtained with only slight discoloration and which, by precipitation in water, will yield molded shapes that are distinguished by improved strengths.

The molding or spinning substances as per invention, may contain up to 10% by weight of other polymers soluble in tertiary amino oxides, such as for instance cellulose derivatives, chitoses, polyamide, polyacrylates, polyvinyl alcohol, etc.

It is already known how to reduce the tendency to auto-oxidation of soybean or cottonseed oils by using reducton additives such as $L(+)$ ascorbic acid, triose reducton and reductic acid (Nippon Nogei Kagaku Kaishi 45,(1971), p. 489, Chemical Abstracts vol. 77, 3944 m, 1972). These oils have a high content of polyunsaturated fatty acids, particularly linoleic acid. At room temperature, the double carbon bonds contained in these fatty acids, will gradually be affected by atmospheric oxygen. Discoloration of the oils will result thereby. The addition of reductones will result in slowing the effects of atmospheric oxygen, so that the oils will remain usable for a longer time.

It is also known to add ascorbic acid and citric acid to sunflower oil and linoleic acid methylester in order to, respectively, reduce the tendency to auto-oxidation and increase shelf life. From U.S. Pat. No. 3,649,585, a process has furthermore become known, wherein gallic acid as additive is enhancing heat stabilization in an ABS polymer modified with ethylene diaminebis-stearamide.

Finally, it has become known from a Japanese Letters Patent, that by the addition of ascorbic acid in oxygen bleaching of cellulose, the cellulose products will have a distinctly higher degree of polymerization (DP) than would be the case in bleaching without the addition of ascorbic acid, (Japan. Kokai No. 7638 508).

The difference exists between the invention and the known process, that in the one instance the cellulose is dissolved (which means that the intermolecular hydrogen bridge bonds have been destroyed), whilst in the other instance the cellulose remains undissolved (which means that the structure with its hydrogen bonds between the polymer molecules, which is typical for cellulose, is being preserved to a great extent).

It has furthermore been proposed, that polymer decomposition of cellulose during the dissolving and processing sequence, be reduced by the addition of citric acid and/or glucose.

The improvements attained thereby remain, however, distinctly behind the results obtained with the process as per invention.

Coming into consideration as tertiary amino oxides are all those capable of dissolving cellulose and stabilized in respect of water. Exemplary therefor are dimethylethanolamino oxide, trimethylamino oxide, certain monocyclical N-methylamine-N-oxides such as N-methyl morpholine-N-oxide, N-methyl piperidine-N-oxide, N-methyl homopiperidine-N-oxide, N-methyl pyrrolidine-N-oxide, as well as other cyclical amino oxides where the amino oxide group is located outside of the ring, such as di-N-methyl cyclohexylamine-N-oxide and dimethyl hexylamine-N-oxide.

N-methyl morpholine-N-oxide (NMMO) has proved particularly suitable.

In given instances, the molding, or, respectively, spinning substance will contain up to 25% by weight of a non-solvent, preferably 10–25% by weight, with water, lower monovalent or polyvalent alcohols, dimethyl formamide, dimethyl sulfoxide, higher boiling amides, particularly the amine corresponding to the tertiary amino oxide coming into consideration as non-solvents.

The additives as per invention are, apart from glycerol aldehyde, organic compounds constituted from a minimum of four carbon atoms and a minimum of two conjugated double bonds and a minimum of two groups in the form of hydroxyl and/or amino groups which, in turn, have a minimum of one unsubstituted hydrogen atom.

A preferred embodiment of the invention is characterized by the hydroxyl and/or amino groups being bonded to adjacent carbon atoms.

A further preferred embodiment of the invention is characterized by the hydroxyl and/or amino groups, being bonded to the carbon atoms 1 and 4.

In the first-named embodiment, the adjacent carbon atoms bonded to the hydroxyl and/or amino groups are preferably linked to each other by a double bond.

Outstandingly suitable additives are such enediol compounds which are stabilized in the α position by a double carbonyl bond, the so-called reductones.

Exemplary for such compounds are L(+) ascorbic acid, isoascorbic acid, triose reductone and reductic acid.

Also outstandingly suitable as additives are compounds characterized by the four carbon atoms and both conjugated double bonds being portions of an aromatic ring system, particularly when the aromatic ring system is a benzene nucleus. Such efficacious additives are pyrocatechol, pyrogallol, gallic acid, the methyl ester, ethyl ester, propyl ester and isopropyl ester of gallic acid.

Other outstandingly efficacious additives are: Hydroquinone, 4(methylamino)phenol sulfate, N-cyclohexyl-N'-(2-cyanoethyl)-1,4 Phenylene diamine, N-cyclohexyl-N'-phenyl-1,4 phenylene diamine.

With the most efficacious additives, such as, for instance, the propyl ester of gallic acid, an addition of 0.01% by weight, relative to the solvent quantity, will suffice. Of the additives as claimed per invention, not more than 0.5% by weight need be added in order to obtain full efficacy against polymer decomposition. Substances previously used for the prevention of polymer decomposition, such as citric acid and glucose, must be added at a minimum of 3.5% by weight and will only attain an effect distinctly inferior when compared with the additives as per invention.

Object of the invention is also a process for the production of the molding or spinning substance, characterized by the cellulose and, in given instances, also the other polymer being stirred at temperatures between 70° and 190° C. in a tertiary amine oxide containing the organic compound as additive and, in given instances, up to 25% by weight of a non-solvent, such stirring to proceed until the cellulose has been dissolved.

At higher concentrations of cellulose in the molding or spinning substance, it would be suitable to perform the process also at higher temperatures, but this became possible only by using the additives as described in the invention. It is suitable to perform the process at high temperatures, i.e. about 150° to 180° C., also in instances where other polymers have been admixed.

It will be particularly appropriate to process at temperatures between 70° and 100° C., when the concentration of cellulose in the molding and spinning substance is low and amounts to about 5–8% by weight. In order to hold the processing time as low as possible and to attain high production rates, the process is performed at temperatures between 100° and 150° C., particularly when the molding or spinning substance contains only cellulose and no synthetic polymers. The optimal temperature will, therein, be between 115° and 130° C.

Since the additive remains fully efficacious even after repeated use, and will remain dissolved in the tertiary amino oxide after the precipitating agent has been segregated from the spent precipitating bath, it is a preferred embodiment of the process as per invention wherein the mixture of tertiary amino oxide, nonsolvent and additive is being recovered from the precipitating bath of the molding process.

The non-solvent in the molding or spinning substance and the precipitating agent for molding are, generally, identical. Water is preferably used therefor. The excess precipitating agent was separated by evaporation in a thin-film evaporator, and this has, so far, not resulted in impairing the reusability of said precipitating agent.

Object of the invention is, furthermore, the use of the molding or spinning substance for the production of molded shapes such as filaments, films or membranes in the form of hollow filament, tubular or flat films. For the production of such molded shapes, the molding spinning substance is extruded in the known manner through nozzles and into a precipitating bath. Coming into consideration as precipitating bath are such liquids and solutions which are miscible with the tertiary amino oxide. Water, lower monovalent and polyvalent alcohols, ketones, amines and aqueous solutions in particular may be named therefor. The aforenamed substances may be used per se or intermingled. In order to influence coagulation, the precipitating bath will preferably contain up to 40% by weight tertiary amino oxide.

DESCRIPTION OF THE PREFERRED EMBODIMENTS

1. Standardized dissolving and precipitating process 2 g (10%) cellulose (Type B 800), 0.6 g (3%) additive and 17.4 g (87%) N-methyl-morpholine oxide (NMMO) with a water content of about 13.5% by weight relative to the quantity of amino oxide, are carefully mixed and heated for 20 minutes in a glass tube (internal diameter 22 mm, length 170 mm) surrounded by a jacket with silicone oil held at 150° C. flowing through said jacket.

During the time of heating, stirring is made with a helical stirrer tightly fitted into the glass tube.

The cellulose is subsequently precipitated in water, comminuted in a high-speed agitator (Waring Blender), syphoned off and washed with water.

The entire aqueous phase is held to below 300 ml and augmented with water to 300 ml for the investigation by spectral photometry.

The precipitated cellulose is washed further with ample quantities of water and subsequently with aceton and finally dried in a vacuum drying cabinet for 24 hours at 60° C.

2. Degree of polymerization of the precipitated cellulose

The degree of polymerization (DP) of the cellulose is determined by viscosimetry of a solution of cellulose in cupriethylenediamine at 25° C. and by the method described in the journal Papier 10 (1956) p. 135.

Determination of the viscosity of the solution (LV) and computation of the DP therefrom is made as follows:

DP determination in cellulose

The degree of polymerization (DP) is computed from the viscosity of cellulose solutions in cupriethylenediamine. Satisfactory results for the DP were obtained only with the LV range between 1.5 and 2.5 with the use of an Ubbelohde viscosimeter having a capillary diameter of 0.87 mm. Computation of the DP is based upon the following two relations:

$$[\eta] = \cdot - \frac{\eta\ red.}{1 + k \cdot \eta\ spec.} \quad [\eta] = 0.82 \times 10^{-3} P_w\ 0.9$$
$$k = 0.29$$

The DP is obtained therein as median weight ($P_w$).

The DP values obtainable after precipitation of the cellulose are listed for a number of additives in table I (standard condition).

The influence of additives upon cellulose decomposition in different concentrations is being pursued further. Results thereof are compiled in tables IIA and IIB.

For gallic acid propylester and gallic acid, additional determination was made in respect of polymer decomposition relative to temperature and time, and also for weight losses of cellulose during the dissolving and precipitating process.

The results are compiled in tables III, IV and V.

3. Color of the NMMO-containing aqueous extract

The by far greater part of the low-molecular colored decomposition products of cellulose will, during the precipitating process, convert into the aqueous phase and will be measured by spectral photometry. Such investigation will not yield direct data on the condition of the precipitated polymer, but the color of the extract will, in most instances, correlate to that of the precipitated polymer.

Extinction determination of the aqueous extracts

The measurements by spectral photometry relate to the abovenoted aqueous extract quantity of 300 ml. Determination is made in flat glass dishes, with a layer thickness of 10 mm in the wavelength range from 300 to 750 mm. Extinction of the samples is measured against water.

The extinction values at λ=550 nm are used in the computation of the extinction quotient which is the quotient of the extinction of the sample with an additive and of an identically treated sample without additive.

Extracts darker than the reference samples will result in numerical values >1, brighter and thus better ones will results in values <1. Results are shown in the last column of table I and IIA.

4. Polymer loss in precipitated cellulose

During the dissolving process, the cellulose as used is subjected to oxidative decomposition.

The polymer loss occurring therein in the precipitated cellulose may partly be substantial at longer dissolving time and/or higher dissolving temperature, and this is evidenced by tables IV and V.

5. Tests in the extruder

These experiments should ascertain whether the results obtained in the laboratory could also be obtained in the extruder.

Cellulose membranes from solutions with and without additives are produced in a dual-screw extruder having a degassing zone.

Processing conditions are shown in table VIA.

Results are tabulated in table VIB.

Since in the experiments with additives the cellulose decomposition is only very limited, the molding or spinning substance will, with identical cellulose concentration, be of a higher viscosity than a substance without additives. This necessitates that in order to attain the usual molding or spinning conditions, the cellulose concentration of the spinning solution therein has to be lower than in a solution without additives.

6. Production of dialysis membranes

A mixture of (relative to the weight of the spinning solution), 7 to 25% cellulose and 75 to 93% NMMO, is brought into solution in a dual screw extruder at a temperature of 150° C. and within maximum 4 minutes, and then extracted through a wide-orifice nozzle, annular orifice nozzle or hollow-filament nozzle, washed and, after plasticizer has been added, dried with inhibited shrinking at temperatures between 50° and 110° C. and reeled up.

Discussion of results:

The following is evidenced by the results of experiments and tests:

Under the standard conditions, the cellulose (Type B 800), will, without additive, be subjected to a polymer decomposition from DP=795 to DP=185, i.e. 77% of the initial value. With good addittives, the DP reduction will, however, be maximum only 5% by weight.

The most favorable additive concentrations are, with gallic acid, pyrogallol and L(+) ascorbic acid at 5% by weight, and with gallic acid propyl ester even at only 0.01% by weight, in each instance relative to the solvent quantity.

When using gallic acid as additive in a concentration of 0.5% by weight, the cellulose solvent mixture (NMMO, gallic acid, water), may be used repeatedly for dissolving of cellulose. Even after having used the solvent mixture five times, there will be no stronger decomposition of cellulose than during the first use, and this signifies that there exists practically no consumption of the solvent.

Repeated usability of the solvent mixture represents a great advantage.

Even at high dissolving temperatures, the cellulose in the samples containing additives will undergo only slight decomposition (ref. tables III and IV).

When cellulose is dissolved at high temperatures over a longer period, i.e. 40 or 60 minutes, it will normally undergo strong decomposition and will only have a correspondingly lower DP, (<20% of the initial DP).

Contrary to the foregoing, no DP loss depending upon time or temperature can be noted when using solutions with additives. Polymer losses, too, are lower by a minimum of 70% than is the case with samples without additives (ref. tables IVA to IVD and V).

Gallic acid propyl ester will not only almost fully inhibit polymer decomposition, but it also remains efficacious even in very small concentrations.

Added to these advantages is also the very bright color of solution and extract.

The results found in the laboratory can be confirmed in the extruder. A certain difficulty is, however, presented by the very high viscosity of cellulose solutions with additives. 20% solutions, which normally are readily castable, can, when containing additives, be processed only at higher temperatures which, however, due to the additive as per invention, has become possible without difficulties.

In spinning tests with high-strength filaments, wherein molding or spinning substances with gallic acid as additive were used, the DP of the filaments was still at 650, although the processing temperature had been increased by 40° C. and processing time was ten times as high.

Ground beech sulfite cellulose (Type B 800), with an initial DP of 795, is normally reduced under standard conditions to a DP of 185, and was thus considered hitherto as unsuitable for the production of high-quality filaments, films or membranes.

By using a solution containing gallic acid propyl ester as additive, decomposition is, however, reduced to a DP of 787, so that it now became possible, even to produce high-strength filaments from an inferior type of cellulose.

Ground pine sulfite cellulose (Type FDY 600), shows an initial DP of 1535.

Under standard conditions, the aforesaid DP will normally be reduced to a DP of 237, but when using a solution with gallic acid as additive, the DP will be reduced to only 1244.

TABLE I

| Additive | Concentr. at LV measurement $\left[\frac{g}{1}\right]$ | Solution viscosity LV | Limit viscos. $[\eta]$ | Degree of polymeriz. $P_w$ | Extinction quotient at 550 nm |
|---|---|---|---|---|---|
| Gallic acid propyl ester | 1,67 | 1,657 | 0,331 | 786,6 | 0,26 |
| Gallic acid | 1,67 | 1,611 | 0,391 | 742,5 | 0,74 |
| Pyrogallol | 1,67 | 1,533 | 0,301 | 703,6 | 1,42 |
| L(+) ascorbic acid | 5,0 | 3,399 | 0,233 | 662,1 | 5,44 |
| DL glycerol aldehyde | 5,0 | 3,042 | 0,257 | 592,3 | 13,0 |
| N—cyclohexyl-N—isopropyl-1-4 phenylene-diamine | 2,5 | 1,754 | 0,248 | 569,3 | 1,24 |
| 1,4-phenylene diamine | 5,0 | 2,857 | 0,241 | 553,7 | 0,33 |
| N—cyclohexyl-N'—phenyl-1,4-phenylene diamine | 5,0 | 2,752 | 0,232 | 530,5 | 0,43 |
| Hydroquinone | 5,0 | 2,671 | 0,225 | 512,3 | 2,35 |
| 4-methylamino phenol-sulfate | 5,0 | 2,611 | 0,220 | 493,4 | 0,95 |
| Comparison without addit. | 5,0 | 1,517 | 0,09 | 185,0 | 1,00 |
| Comparison with citric acid | 5,0 | 2,402 | 0,199 | 447,8 | 0,34 |

TABLE IIA

Efficacy of some additives at various concentrations (standard conditions)

| Additive quantity (In g/liter) | Additive | Concentr. at LV measurem't | Solution viscosity | Limit viscosity | Degree of Polymeriz. $P_w$ | Extinction quotient at 550 nm |
|---|---|---|---|---|---|---|
| 3,0 | Gallic acid | 1,67 | 1,611 | 0,311 | 742,5 | 0,74 |
| 1,0 | Gallic acid | 1,67 | 1,532 | 0,277 | 643,8 | 0,73 |
| 0,5 | Gallic acid | 1,67 | 1,546 | 0,283 | 660,1 | 0,84 |
| 0,2 | Gallic acid | 5,0 | 1,936 | 0,147 | 319,5 | 0,78 |
| 0,1 | Gallic acid | 5,0 | 1,539 | 0,0932 | 192,3 | 1,83 |
| 3,0 | Pyrogallol | 1,67 | 1,588 | 0,301 | 708,6 | 1,42 |
| 1,0 | Pyrogallol | 1,67 | 1,498 | 0,261 | 606,1 | 1,11 |
| 0,5 | Pyrogallol | 1,67 | 1,56 | 0,289 | 676,5 | 1,09 |
| 3,0 | L (+) ascorbic acid | 5,0 | 3,399 | 0,283 | 662,1 | 5,44 |
| 1,0 | L (+) ascorbic acid | 5,0 | 3,074 | 0,259 | 598,7 | 1,87 |
| 0,5 | L (+) ascorbic acid | 5,0 | 2,629 | 0,221 | 502,7 | 1,17 |
| 3 | Gallic acid propyl ester | 1,67 | 1,657 | 0,331 | 786,6 | 0,78 |
| 1 | Gallic acid propyl ester | 1,67 | 1,565 | 0,291 | 682,1 | 0,23 |
| 0,5 | Gallic acid propyl ester | 1,67 | 1,624 | 0,317 | 749,5 | 0,30 |
| 0,3 | Gallic acid propyl ester | 1,67 | 1,618 | 0,314 | 742,7 | 0,44 |
| 0,2 | Gallic acid propyl ester | 1,67 | 1,611 | 0,311 | 734,8 | 0,47 |
| 0,1 | Gallic acid propyl ester | 1,67 | 1,601 | 0,307 | 723,4 | 0,34 |
| 0,05 | Gallic acid propyl ester | 1,67 | 1,621 | 0,316 | 746,1 | 0,34 |
| 0,03 | Gallic acid propyl ester | 1,67 | 1,603 | 0,3079 | 725,7 | 0,45 |

TABLE IIA-continued

Efficacy of some additives at various concentrations (standard conditions)

| Additive quantity | | (In g/liter) Concentr. at LV measurem't | Solution viscosity | Limit viscosity | Degree of Polymeriz. $P_w$ | Extinction quotient at 550 nm |
|---|---|---|---|---|---|---|
| 0,01 | Gallic acid propyl ester | 1,67 | 1,607 | 0,3097 | 730,2 | 0,53 |

TABLE IIB

Repeated usage of NMMO with 0.5% by weight of gallic acid as additive

| Dissolving temp. °C. | Dissolving time in mins. | Concentr. $\left[\frac{g}{l}\right]$ | Solution viscosity | $[\eta]$ | $P_w$ |
|---|---|---|---|---|---|
| 150 | 20 | 5 | 2,808 | 0,237 | 543,0 |
| 150 | 20 | 5 | 2,955 | 0,250 | 574,4 |
| 150 | 20 | 5 | 2,820 | 0,238 | 545,8 |
| 150 | 20 | 5 | 3,144 | 0,264 | 612,6 |
| 150 | 20 | 5 | 2,799 | 0,236 | 540,9 |
| 170 | 60 | 5 | 2,108 | 0,168 | 369,4 |

TABLE III

Temperature dependence of polymer decomposition with 0.5% by weight of gallic acid and without gallic acid, at 20 minutes test time.

| Heating bath temp. | Additive | Concent. $\left[\frac{g}{l}\right]$ | Solution viscosity | $[\eta]$ | $P_w$ | Polymer loss in % |
|---|---|---|---|---|---|---|
| 150 | − | 5 | 1,567 | 0,097 | 201,9 | 14,6 |
| 150 | + | 5 | 3,754 | 0,306 | 721,1 | 3,6 |
| 160 | − | 5 | 1,459 | 0,081 | 164,6 | 7,6 |
| 160 | + | 5 | 3,358 | 0,280 | 653,1 | 4,2 |
| 170 | − | 5 | 1,495 | 0,087 | 177,0 | 10,7 |
| 170 | + | 5 | 3,283 | 0,275 | 639,2 | 3,6 |
| 180 | − | 5 | 1,379 | 0,068 | 136,1 | 9,6 |
| 180 | + | 5 | 3,198 | 0,269 | 623,0 | 3,6 |

TABLE IVA

Time dependence of polymer decomposition with 0.5% by weight of gallic acid and without gallic acid at 180° C. heating temp.

| Test time in mins. | Additive | $\left[\frac{g}{l}\right]$ | Solution viscosity | $[\eta]$ | $P_w$ | Polymer loss in % |
|---|---|---|---|---|---|---|
| 20 | − | 5 | 1,379 | 0,068 | 136,1 | 9,6 |
| 20 | + | 5 | 3,198 | 0,269 | 623,0 | 3,4 |
| 40 | − | 5 | 1,528 | 0,042 | 188,6 | 29,5 |
| 40 | + | 5 | 3,512 | 0,291 | 681,3 | 11,2 |
| 60 | − | 8 | 1,651 | 0,069 | 136,6 | etwa 35 |
| 60 | + | 3,33 | 1,867 | 0,208 | 468,7 | etwa 10 |

TABLE IVB

As IVA, but at 170° C. heating bath temperature

| Test time in mins. | Additive | Concent. $\left[\frac{g}{l}\right]$ | Solution viscosity | $[\eta]$ | $P_w$ | Polymer loss in % |
|---|---|---|---|---|---|---|
| 20 | − | 5 | 1,495 | 0,087 | 177,0 | 10,7 |
| 20 | + | 5 | 3,283 | 0,275 | 639,2 | 3,6 |
| 40 | − | 5 | 1,383 | 0,069 | 137,6 | 17,9 |
| 40 | + | 5 | 3,133 | 0,264 | 610,4 | 11,2 |
| 60 | − | 10 | 1,958 | 0,075 | 151,0 | |
| 60 | + | 3,33 | 2,034 | 0,239 | 546,6 | |

TABLE IVC

As IVA, but at 130° C. heating bath temperature

| 20 | − | 5 | 1,459 | 0,081 | 164,6 | 7,6 |
|---|---|---|---|---|---|---|
| 20 | + | 5 | 3,358 | 0,280 | 653,1 | −4,2 |
| 40 | − | 5 | 1,499 | 0,087 | 178,6 | 15,7 |
| 40 | + | 5 | 2,95 | 0,249 | 537,4 | 3,6 |
| 60 | − | 10 | 1,867 | 0,069 | 153,2 | |
| 60 | + | 1,67 | 1,470 | 0,248 | 571,0 | |

TABLE IVD

As IVA, but at 150° C. heating bath temperature

| 20 | − | 5 | 1,567 | 0,097 | 201,9 | 14,6 |
|---|---|---|---|---|---|---|
| 20 | + | 5 | 3,754 | 0,306 | 729,1 | 3,6 |
| 40 | − | 5 | 1,476 | 0,084 | 170,6 | 9,1 |
| 40 | + | 5 | 3,279 | 0,274 | 638,4 | 0,8 |
| 60 | − | 5 | 1,453 | 0,080 | 162,5 | |
| 60 | + | 3,33 | 2,14 | 0,257 | 596,1 | |

TABLE V

Time dependence of polymer decomposition with 0.5% gallic acid and without gallic acid at 180° C. heating bath temperature

| Test time in mins. | Additive | Concent. $\left[\frac{g}{l}\right]$ | Solution viscosity | $[\eta]$ | $P_w$ | Polymer loss in % |
|---|---|---|---|---|---|---|
| 20 | + | 2 | 1,816 | 0,330 | 783,4 | 5,8 |
| 20 | − | 5 | 1,529 | 0,092 | 188,9 | 15,2 |
| 40 | + | 2 | 1,773 | 0,316 | 746,1 | 5,8 |
| 40 | − | 5 | 1,496 | 0,087 | 177,5 | 35,5 |
| 60 | + | 2 | 1,803 | 0,326 | 772,2 | 12,9 |
| 60 | − | 5 | 1,463 | 0,082 | 166,0 | 32,8 |

TABLE VIA

| Test | Cellul. concentration of solution | (In % by weight) Additive | Extruder speed (min.$^{-1}$) | Extruder temperat. | Spinning pump delivery (ml/min) | (bar) | Nozzle orifice width (μm) | Draw-off speed (m/min) |
|---|---|---|---|---|---|---|---|---|
| 52 A/B | 20% Type B 800 | 3% ascorbic acid | 150 | 100/120 | 15,8–31,6 | 100 | Solution too viscous at extruder temp. Unspinnable | |
| 52 C | 10% Type B 800 | 1,5% ascorbic acid | 250 | 120 | 31,6 | <10 | 200 | 2,2 |
| 53 | 15% Type B 800 | 1,5% ascorbic acid | 290 | 100 | 31,6 | 12 | 200 | 2,2 |

TABLE VIB

| Test | Thickness μm wet | % ATRO | Breaking load longitudinal wet, cN/tex | Elong. on frac. long. wet % | C in g/l | LV | Limit visc. [η] | Degree of Polymerization $P_w$ |
|---|---|---|---|---|---|---|---|---|
| 52 A | | | | | 5 | 2,958 | 0,25 | 575,6 |
| 52 B | | | | | 2,5 | 1,778 | 0,254 | 585,1 |
| 52 C | 80 | 23 | ca. 1000 | ca. 30 | 2,5 | 1,887 | 0,282 | 659,1 |
| 53 | 70 | 31,5 | 1552 | 17,9 | 3 | 2,094 | 0,277 | 645,4 |
| | | | | | | | | 795 |

We claim:

1. Molding or spinning substance, comprising by weight 4.99–25% cellulose, 95–50% of a tertiary amine oxide, in given instances up to 25% of a non-solvent and up to 10% of other polymers, all proportions relative to the weight of the molding or spinning substance, and as additive, singly or in a mixture, 0.01 up to 0.5% by weight, relative to the tertiary amine oxide, of an organic compound with a minimum of four carbon atoms and a minimum of two conjugated double bonds and a minimum of two groups in the form of hydroxyl and/or amino groups which, in turn, have a minimum of one unsubstituted hydrogen atom and/or contain glycerol aldehyde, said additive being soluble in said tertiary amine oxide as well as its mixture with said non-solvent.

2. Molding or spinning substance according to claim 1, wherein the hydroxyl and/or amino groups are bonded to the carbon atoms 1 and 4.

3. Molding or spinning substance according to claim 1, wherein the hydroxyl and/or amino groups are bonded to adjacent carbon atoms.

4. Molding or spinning substance according to claim 3, wherein the adjacent carbon atoms are linked by a double bond.

5. Molding or spinning substance according to claim 4, wherein the other double bond is a double carbonyl bond.

6. Molding or spinning substance according to claim 5, wherein the organic compound is L(+) ascorbic acid.

7. Molding or spinning substance according to claim 1, wherein the four carbon atoms and two conjugated double bonds are constituents of an aromatic ring system.

8. Molding or spinning substance according to claim 7, wherein the aromatic ring system is a benzene nucleus.

9. Molding or spinning substance according to claim 1 or claim 28, wherein the organic compound is pyrocatechol, pyrogallol, gallic acid, or the methyl ester, ethyl ester, propylester or isopropyl ester of gallic acid.

10. Molding or spinning substance according to claim 2 or claim 28, wherein the organic compound is hydroquinone, 4(methylamino)phenol sulfate, N-cyclohexyl-N'-(2-cyanoethyl)-1,4-phenylene diamine or N-cyclohexyl-N'-phenyl-1,4-phenylene diamine.

11. Process for producing the molding or spinning substance according to claim 1, comprising stirring the cellulose and, in given instances, also the other polymer, at temperatures between 70° and 190° C. in a tertiary amino oxide containing the organic compound as additive and, in given instances, up to 25% by weight of a non-solvent, said stirring to proceed until the polymer has been dissolved.

12. Process according to claim 11, wherein said temperature is between 100° and 150° C.

13. Process according to claim 12, wherein the temperature is between 115° and 130° C.

14. Process according to claim 11, wherein the mixture of tertiary amino oxide, non-solvent and additive has been recuperated from the precipitating bath of a molding process.

15. In a process for the production of molded shapes of the type in which a molding or spinning substance is extruded through an extruder, the improvement comprising employing the molding or spinning substance according to claim 11.

* * * * *